(No Model.)

J. F. BENNETT.
CURVED PIPE.

No. 298,059. Patented May 6, 1884.

Witnesses.
A. B. Harrison.
H. W. Stricker.

Inventor.
John Francis Bennett
J. H. Adriaans
Attorney

N. PETERS, Photo-Lithographer, Washington, D. C.

UNITED STATES PATENT OFFICE.

JOHN FRANCIS BENNETT, OF PITTSBURG, PENNSYLVANIA.

CURVED PIPE.

SPECIFICATION forming part of Letters Patent No. 298,059, dated May 6, 1884.

Application filed September 24, 1883. (No model.)

*To all whom it may concern:*

Be it known that I, JOHN FRANCIS BENNETT, of Pittsburg, in the county of Allegheny and State of Pennsylvania, have invented certain new and useful Improvements in Curved Pipes; and I do hereby declare that the following is a full, clear, and exact description thereof, reference being had to the accompanying drawings, and to the letters of reference marked thereon, which form part of this specification.

My invention relates to improvements in curved pipes in which the area of the pipe at the point of curvature is slightly enlarged; and the objects of my improvements are, first, to afford the least possible obstruction to fluids passing through the pipe; and, second, to necessitate, therefore, less power or pressure to force the fluid through the pipe than heretofore requisite. I attain these objects by the pipe illustrated in the accompanying drawings, in which—

Figure 1:
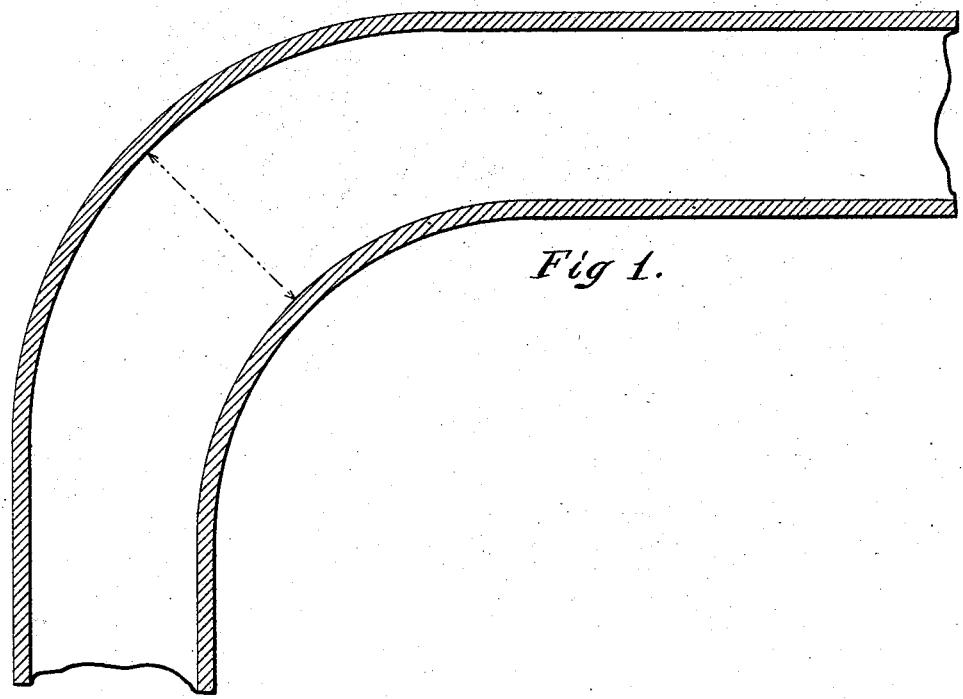
Figure 2:
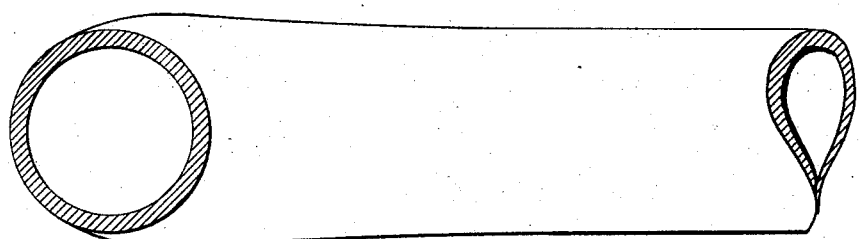

Figure 1 represents a longitudinal section of a pipe embodying the principles of my invention, and Fig. 2 is a perspective view of the same.

It is a matter of common experience that the resistance offered to fluids in their passage of curves must always be taken into account in the estimation of a power necessary to deliver the fluid at a given pressure at the point of supply. Frequently the percentage of loss of velocity or pressure amounts to one-half that of the initial pressure, and when the source is a considerable distance from the point of delivery—as in the case of city water-supply, where the liquid is frequently conducted from twenty to fifty miles—it is obvious that obstruction is a factor causing much perplexity and expenditure. Almost invariably it is necessary to apply power to the water in order to reach the point of delivery with sufficient pressure. Theoretically the entire volume of water a pipe of a given area at a given pressure is capable of receiving should always rise at any point to an altitude equal to that of the source, and the fact that it does not is chargeable solely to friction and obstruction. While it is neither possible nor desirable to dispense with friction and obstruction entirely, the mechanical conditions which produce them are capable of such alteration as greatly to diminish them, and thereby secure a more economical conveyance of the water. These statements apply with great force to the transmission of water for purposes of power where any loss of momentum or pressure correspondingly decreases its value as a motor. What has been said as to water applies in different degrees to the transmission of steam, gas, compressed air, and other fluids. It will therefore be understood that this pipe is efficacious in their conveyance as well. For these ends it is necessary that a pipe be provided whose area at the point of curvature shall be such that even where the curve amounts to a right angle there shall be no appreciable obstruction to the passage of a fluid offered; hence I construct a pipe having a curvature amounting to a right angle with an area at its middle point equal to twice that of the main pipe, and decreasing in either direction therefrom until the straight pipe is reached, so that the cubical capacity from base to base of the curve equals that of a section of the body of the main pipe, whose length is the same as the outer line of the curve, whereby the entire volume of flowing fluid passes through the curve, and enters the second straight pipe with the same initial pressure, regardless of the number of curves through which it has passed. When a given volume of solid or fluid matter is compelled to pass a curve in order to preserve the relative location of each molecule of an infinitely thin section thereof in the same vertical plane, a portion should be obliged to travel more slowly than another portion; but a molecule of water is incapable of adapting itself to these circumstances, and travels with equal velocity whether on the longer or shorter side of the curve, whereby obstruction to the remaining molecules is offered; hence the only method by which the blind course of the water can be accommodated to the observance of a reasonable speed is to enlarge the sphere of action of each molecule, so as to diminish its tendency to obstruct. The term "obstruction," as here used, should not be construed synonymously with friction. I decrease the amount of increase of area in proportion as the curve is less than a right angle.

Having thus fully described my invention, what I desire to secure by Letters Patent of the United States is—

A pipe whose curvature amounts to a right angle, having an area at its middle point equal to twice that of the main pipe, and tapering in each direction from that point till the straight pipe is reached, the area at that point decreasing in proportion as the curvature is less than a right angle.

In testimony that I claim the foregoing as my own I affix my signature in presence of two witnesses.

JOHN FRANCIS BENNETT.

Witnesses:
    HENRY W. STRICKLER,
    M. E. HARRISON.